US012682097B2

(12) United States Patent
Brajković et al.

(10) Patent No.: US 12,682,097 B2
(45) Date of Patent: Jul. 14, 2026

(54) API MODEL FOR AS-A-SERVICE DATA RESILIENCE MANAGEMENT

(71) Applicant: HYCU, Inc., Boston, MA (US)

(72) Inventors: Mladen Brajković, Ljubljana (SI); Antal Nemeš, Ljubljana (SI); Subbiah Sundaram, Boston, MA (US)

(73) Assignee: HYCU, INC., Boston, MA (US)

( * ) Notice: Subject to any disclaimer, the term of this patent is extended or adjusted under 35 U.S.C. 154(b) by 0 days.

(21) Appl. No.: 18/426,638

(22) Filed: Jan. 30, 2024

(65) Prior Publication Data

US 2024/0273226 A1     Aug. 15, 2024

Related U.S. Application Data

(60) Provisional application No. 63/442,140, filed on Jan. 31, 2023.

(51) Int. Cl.
G06F 21/62     (2013.01)
G06F 11/1446     (2026.01)

(52) U.S. Cl.
CPC ...... G06F 21/6218 (2013.01); G06F 11/1448 (2013.01)

(58) Field of Classification Search
USPC ........................................................ 726/27
See application file for complete search history.

(56) References Cited

U.S. PATENT DOCUMENTS 10,402,090 B1 * 9/2019 Tsaur ...................... G06F 3/067
11,303,659 B2 4/2022 Yu et al.

| 11,416,641 | B2 | 8/2022 | Narayanaswamy | |
| 12,314,430 | B1 * | 5/2025 | Hardt | .................. G06F 21/6245 |
| 2007/0168715 | A1 | 7/2007 | Herz et al. | |
| 2010/0332401 | A1 | 12/2010 | Prahlad et al. | |
| 2013/0152047 | A1 | 6/2013 | Moorthi et al. | |
| 2015/0135302 | A1 | 5/2015 | Cohen et al. | |
| 2016/0019033 | A1 | 1/2016 | Ebner et al. | |
| 2016/0072831 | A1 | 3/2016 | Rieke | |
| 2016/0330080 | A1 | 11/2016 | Bhatia et al. | |
| 2017/0149624 | A1 | 5/2017 | Chitti et al. | |

(Continued)

FOREIGN PATENT DOCUMENTS

| EP | 3528454 A1 | 8/2019 |
| WO | 2020106973 A1 | 5/2020 |

OTHER PUBLICATIONS

PCT/US24/13443 Search Report and Written Opinion, dated Jun. 24, 2024 (13 pages).

*Primary Examiner* — Brandon Hoffman
(74) *Attorney, Agent, or Firm* — David J. Thibodeau; VLP Law Group LLP

(57)     ABSTRACT

A platform we call an R-Cloud Data Protection Platform supports the ability to recover anything "as-a-Service" at a specified level of granularity. The approach splits data catalog information between the R-Cloud platform and R-Cloud Modules. It provides the ability to describe every as-a-Service related configuration and data hierarchy, their attributes, associations, relevance to data resilience and the associated methods required to protect and recover the different parts of the service and data. This enables the unique approach to cover all as-a-Service, from the simple ones like Google CloudSQL to the most complex ones having millions of dynamic and unstructured objects within.

15 Claims, 5 Drawing Sheets

(56)     References Cited

U.S. PATENT DOCUMENTS

| | | | |
|---|---|---|---|
| 2017/0185488 A1 | 6/2017 | Kumarasamy et al. |
| 2018/0040256 A1 | 2/2018 | Alvarez et al. |
| 2018/0314457 A1 | 11/2018 | Bender et al. |
| 2018/0341666 A1 | 11/2018 | Lee et al. |
| 2019/0036910 A1 | 1/2019 | Choyi et al. |
| 2019/0140914 A1 | 5/2019 | Maes |
| 2019/0207968 A1 | 7/2019 | Heckman et al. |
| 2019/0303961 A1 | 10/2019 | Patankar et al. |
| 2019/0319860 A1 | 10/2019 | Seed et al. |
| 2019/0332485 A1 | 10/2019 | Gill et al. |
| 2019/0342307 A1 | 11/2019 | Gamble et al. |
| 2020/0137097 A1 | 4/2020 | Zimmermann et al. |
| 2020/0244673 A1 | 7/2020 | Stockdale et al. |
| 2021/0203684 A1 | 7/2021 | Maor et al. |
| 2022/0191230 A1 | 6/2022 | Morgan |
| 2022/0318059 A1 | 10/2022 | Cook et al. |

* cited by examiner

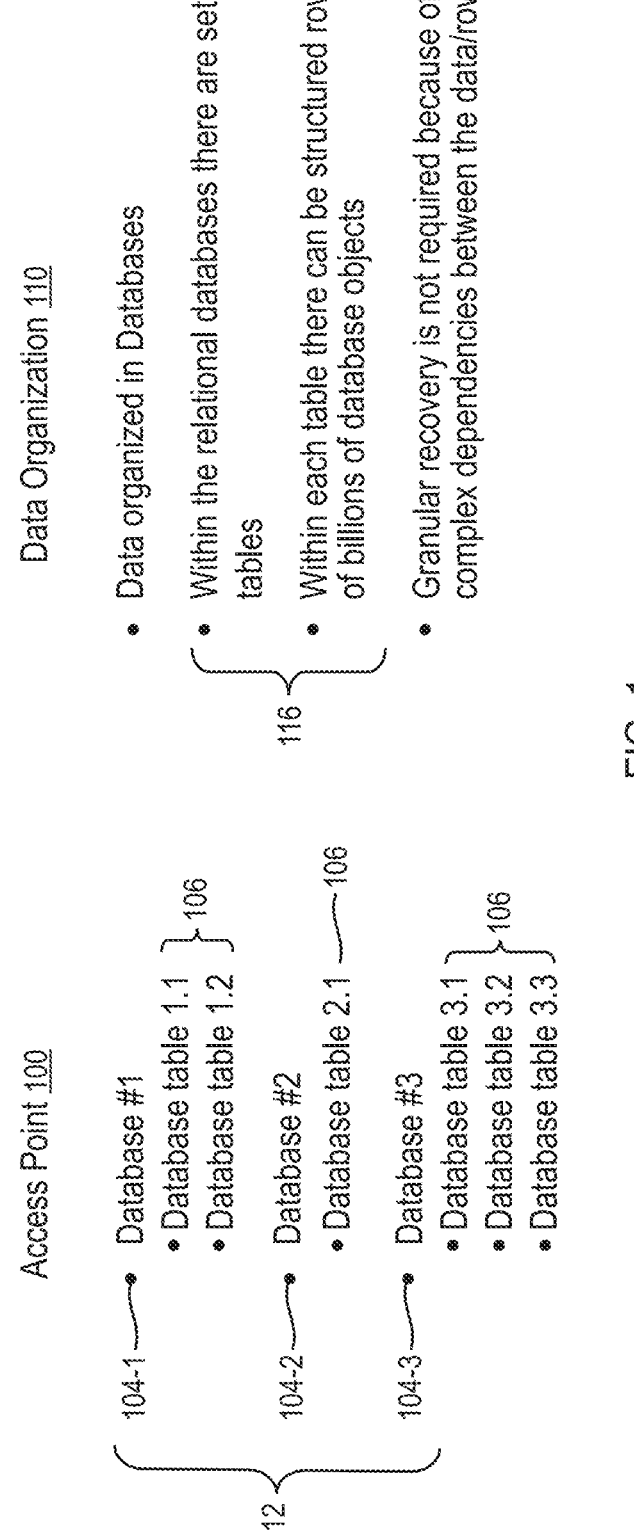

Access Point 100

104-1 — Database #1
  • Database table 1.1 } 106
  • Database table 1.2

104-2 — Database #2
  • Database table 2.1 — 106

104-3 — Database #3
  • Database table 3.1
  • Database table 3.2 } 106
  • Database table 3.3

112

Data Organization 110

• Data organized in Databases

• Within the relational databases there are set of tables

• Within each table there can be structured rows of billions of database objects

• Granular recovery is not required because of the complex dependencies between the data/rows/tables

Figure 2:
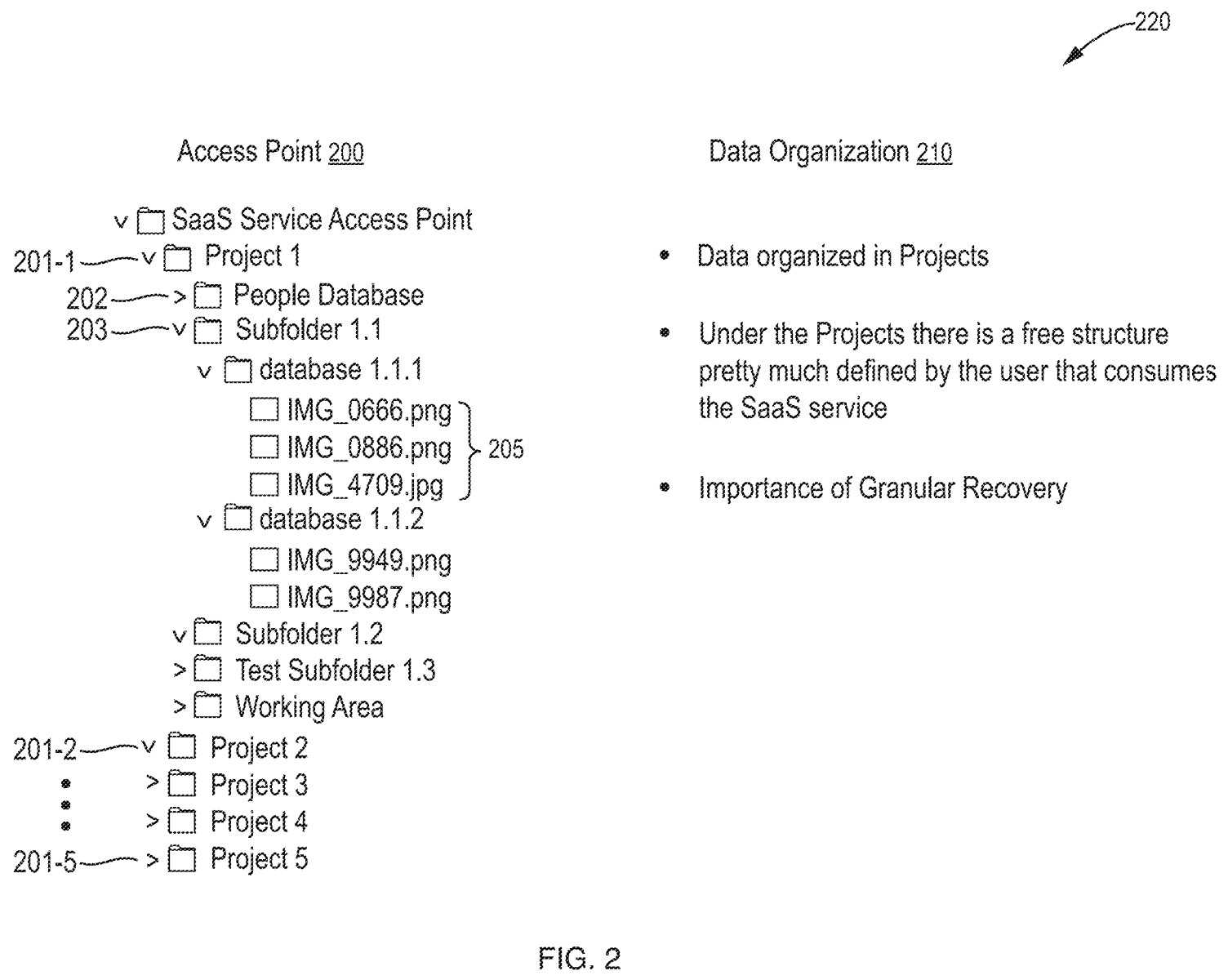

Data Organization 210

- Data organized in Projects

- Under the Projects there is a free structure pretty much defined by the user that consumes the SaaS service

- Importance of Granular Recovery

Access Point 200

∨ ☐ SaaS Service Access Point
201-1 —— ∨ ☐ Project 1
202 —— > ☐ People Database
203 —— ∨ ☐ Subfolder 1.1
    ∨ ☐ database 1.1.1
        ☐ IMG_0666.png ⎫
        ☐ IMG_0886.png ⎬ 205
        ☐ IMG_4709.jpg ⎭
    ∨ ☐ database 1.1.2
        ☐ IMG_9949.png
        ☐ IMG_9987.png
  ∨ ☐ Subfolder 1.2
  > ☐ Test Subfolder 1.3
  > ☐ Working Area
201-2 —— ∨ ☐ Project 2
  > ☐ Project 3
  > ☐ Project 4
201-5 —— > ☐ Project 5

API MODEL FOR AS-A-SERVICE DATA RESILIENCE MANAGEMENT

CROSS REFERENCE TO RELATED APPLICATIONS

This patent application claims priority to:

U.S. Provisional Patent Appl. No. 63/442,138 entitled "DISCOVERY OF SERVICES IN COMBINATION WITH ENABLING DATA PROTECTION AND OTHER WORKFLOWS, Filed Jan. 31, 2023;

U.S. Provisional Patent Appl. No. 63/442,139 entitled R-GRAPH PROPAGATION OF DATA PROTECTION AND COMPLIANCE STATUSES, Filed: Jan. 31, 2023; and U.S. Provisional Patent Appl. No. 63/442,140 entitled API MODEL FOR AS-A-SERVICE DATA RESILIENCE MANAGEMENT Filed: Jan. 31, 2023;

the entire contents of each of which are hereby incorporated by reference.

TECHNICAL FIELD

This patent application relates to a structured way to describe a Service (e.g., SaaS, PaaS, DBaaS, IaaS) related data protection status and configuration and the associated data resilience management methods to enable the ability to protect, and most importantly recover, the data in the service and associated configurations with minimal complexity.

BACKGROUND

Cloud Services (e.g., SaaS (software as a service), PaaS (Platform as a Service), DBaaS (Database as a Service, IaaS (Infrastructure as a Service)) have become an integral part of many business computing environments. The advantages of these cloud services are well known and include the ability to scale to meet demand as needed, and to only pay for what it needed. It is also expensive and time-consuming to maintain any software application on regular basis. However, with as-a-Service mode, the service provider is responsible for the maintenance of the service and to address any issues, freeing the business' own staff from complex software and hardware management.

As more and more of the management of the services have moved from customers to these Cloud Services, the risk of losing the critical data remains. Risks can include things such as human error, data mismanagement such as adopting weak processes for acquiring, validating, storing, protecting, and processing data for its users, or weak data security resulting in complexities to protecting data from unwanted actions such as a cyber-attack or a data breach.

Therefore, a business should have a well thought out recovery plan that considers cloud-based data stored by and/or accessed by their cloud services. Whether the business is an individual, small, medium, or multinational corporation, it is still necessary for such cloud-based data to be adequately protected. Many Cloud Services have mechanisms to protect the data as part of keeping the service up and running, but customer dependent data resilience needs are left up to the customer.

Considering that there are an estimated 17000+ different SaaS applications just in the United States alone, there is no way that any one data protection company can on their own the data resilience for all 17000+ services in a timely manner.

The way to make this come to reality is to enable an easy way for many parties to develop these integrations and to have a platform that can automate the protection at scale.

SUMMARY

There should be a single, simple, and consistent mechanism for developers/integrators to define the structure of data in a Cloud Service, their attributes and mechanisms to backup and recover them. It should be in the context of the service and should assist the information be presented in the context of the service itself. These attribute and mechanism definitions should be taken by the data protection platform and allow it to discover, protect and recover the service in the context of the service. Most important of all is the ability to provide service specific recover workflows. To make the entire process scalable, the integrator should be not expected to develop any custom UI code to create the recovery or the backup workflows.

In summary, an integrator/develop/administrator access a platform that provides a facility to define the way that data are protected by a service. The platform can be used, for example, to determine whether the SaaS itself provides a recovery method, and at which level of granularity those recovery method(s) are provisioned. This information can then be stored in a metadata catalog, to record what "level" of recovery the SaaS itself can provide as well as the specific configuration deployed of each end user.

More particularly, a platform we call the R-Cloud Platform provides an easy way to specify a data resilience (including backup and/or recovery) workflow. The platform provides the facility for an integrator/developer to define the way the configuration and data are held by the service. This definition is flexible to accommodate a wide range of SaaS applications. In addition to the definition, the platform allows the service developer to provide a simple abstraction of how-to backup and recover the different parts of the service. This allows the platform to support different levels or granularity of the recovery for every service.

To enable the protection and granular recovery of the service-related data, the platform also provides a way to maintain the varying types of metadata associated with the granularity of the data being protected and leverages it for granular recovery.

The service definition and resilience methods are orchestrated and leveraged by the R-Cloud Platform to deliver data protection for every "as-a-Service" aaS that integrates with it. The platform delivers significant amount of capability, including but not limited to:

backup data management/retention/copies policy management/scheduling consolidation/reporting consumption management/reporting billing through (incl. various marketplaces from hyperscalers like Google, Amazon, Azure)

This innovation enables the as-a-Service integrator/developer to start with just providing two sets of structured information to the platform to create data resilience for the Service. The two are:

Service Data Definition

Service Data Management

The Service Data Definition is intended for the integrator/developer of the as-a-Service to define the following (including, but not limited to): different levels of hierarchy of the resources within the as-a-Service, such as different data objects or groups of data objects, description of the data objects, the type of data in each of the objects, if the objects have associations with other objects defined in the structure, ability to protect the object, and the sequence in which the data needs to be backed up and recovered.

The Service Data Management can have multiple parts, but the minimum required are the Backup and Restore methods.

For each of the resource type defined in the Service Data Definition, the as-a-Service Integrator/Developer can define the required processing method to protect that part of the object from the service. This is for both Backing up and Restoring.

The platform leverages the Service Data Definition to discover the internals of the data stored in the service, provide backup methods for different data (resource) types as defined by the integrator and provide a User Interface driven restore (restore scenario definition) of the data specific to that Service by invoking the right associated methods.

BRIEF DESCRIPTION OF THE DRAWINGS

FIG. 1 shows the access points and data organization for an example Google Cloud SQL SaaS application.

FIG. 2 shows the access points and data organization for a more complex SaaS application, such as DropBox.

DETAILED DESCRIPTION OF PREFERRED EMBODIMENTS

Figure 3:
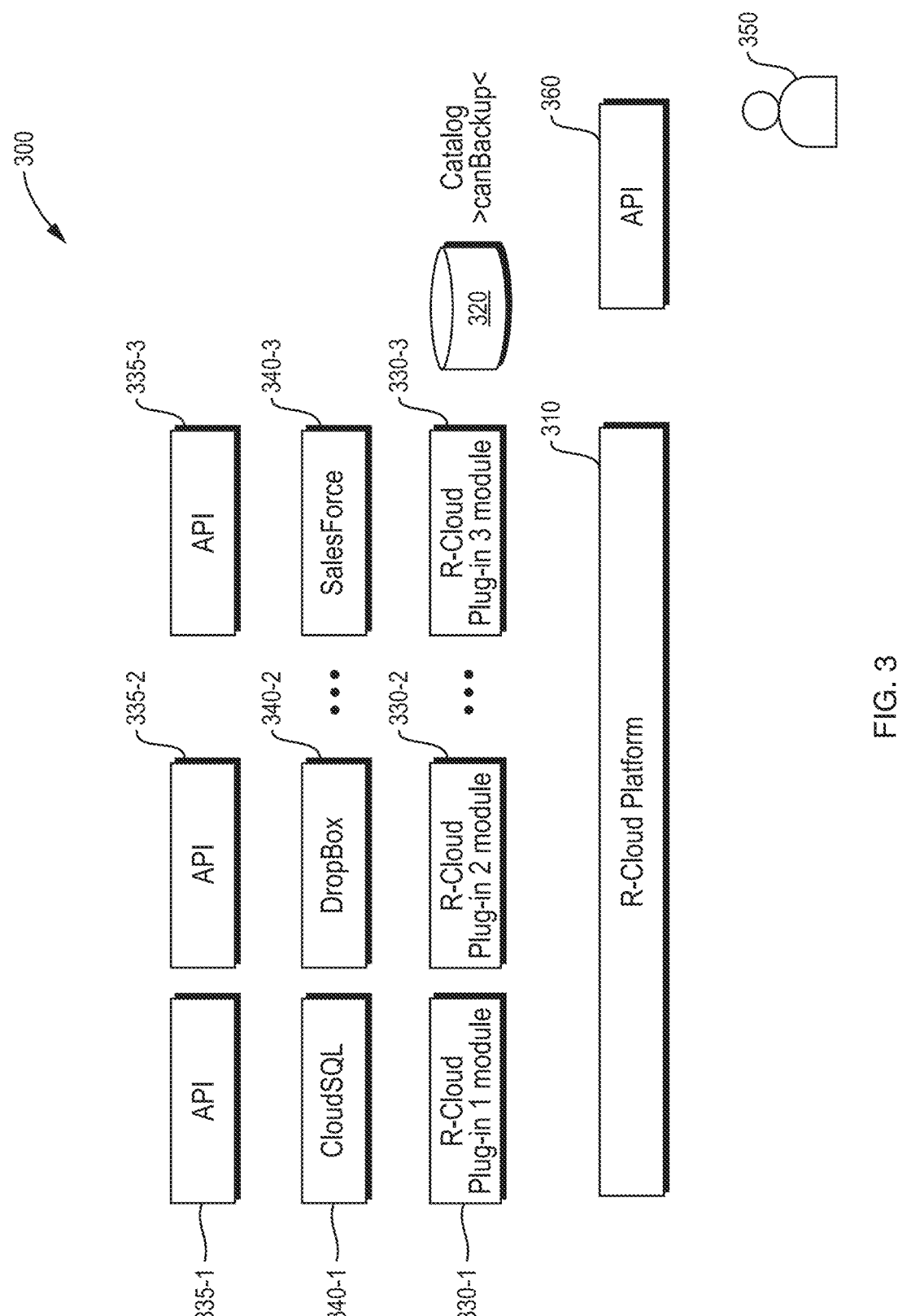
FIG. 3 shows an R-Cloud Platform that manages a catalog that represents the data organization for a SaaS.

An example implementation of a method for recovering a wide range of services, such as a SaaS application, supports different levels of granularity are now described. It should be understood, however, that the same general approach can be applied to provide a structured way to describe any service (e.g., SaaS, PaaS, DBaaS, IaaS) related data and configuration and the associated data resilience management methods. The approach enables the ability to protect, and most importantly recover, the data in the service and associated configurations with minimal complexity.

Data Organization within a Typical Simple SaaS Service

From the perspective of data protection, in one embodiment a typical SaaS service operates in a computing environment that deploys one or more access points to users via an Application Programming Interface (API). The access points consist of various resources behind which data is organized in a hierarchical fashion.

FIG. 1 shows the access points 100 and data organization 110 for an example Google Cloud SQL SaaS application 120. This example has access points that include a relational database instance 102 that includes three relational databases (Database #1 104-1, Database #2 104-2, and Database #3 104-3); each database 104 may be a separate access point. The databases 104 are each further organized into sets of tables 106, with each database having a certain number of tables. For example, database 104-1 has tables 106-1-1 and 106-1-2. The databases 104 do not all have the same number of tables.

Each table 106 may include structured rows of billions of data objects. Looking at this from a data protection perspective, granular recovery is not required by this particular user (that is, recovery of individual specific tables), because of complex relationships between the data in the rows/columns. Recovery of the entire database is sufficient.

In this example, based on the data organization attributes 110, the sufficient granularity requirements for data protection are:

backup of the whole service or a selected database recovery of the whole service or a selected database Example of Complex Data Organization within a SaaS Service FIG. 2 shows the access points 200 and data organization 210 for a more complex SaaS application 220, such as DropBox.

This DropBox application 220 hosts data for several different Projects 201-1, 201-2, 201-3, 201-4, 201-5; the data for each project 201 is further organized in folders 203 and files 205 (or other objects such as databases 202) in a hierarchical directory. The files 205 are typically organized such that there is a folder 203 for each project 201, and each project 201 in turn has data stored in many subfolders. Each subfolder may contain files, databases, or other objects related to some specific aspect of its associated project (here project 201-1 is indicated as the individual databases of .PNG files). The data service points thus also correspond to different levels of this hierarchy, such the different Projects (folders) and subfolders. Granular recovery, say of each project or even of each individual file, is important in this particular access point instance for this particular user.

In this case the data organization 210 indicates requirements for data protection include:

backup of the whole service or only a selected project recovery of the whole service or only a selected project recovery of only a specific single item/object within the service To protect this SaaS access point 200 appropriately, a metadata catalog is maintained that reflects the one or more levels at which recovery is needed.

Split Catalog of Protected Items in Order to Provide Granular Recovery

As shown in FIG. 3, a platform called the R-Cloud Platform 310) manages a catalog 320 that represents the data organization 110, 210 for each SaaS 340-1, 340-2, 340-3 in use by the enterprise. Note that the R-Cloud platform may be accessed by a user 350 via an API 360; in addition, each SaaS provides the aforementioned access ppoints via their own respective APIs 335-1, 335-2, 335-3. The catalog 320 stores metadata regarding the organization and attributes of the data objects within one or more SaaS services operated by an enterprise. The catalog 320 is maintained by the R-Cloud platform 310 in cooperation with a number of plug-in modules 330. There is, for example an R-Cloud plug-in module 330 for each SaaS 340.

Although an R-Cloud module 330 is provided for each SaaS application 340, the end user 350 need only interact with the R-Cloud platform 310 such as via the API 360. Thus, in the preferred approach, the developer of the R-Cloud plug-in module 330 for a given SaaS can determine whether the SaaS itself provides a recovery method, and at which level of granularity those recovery method(s) are provided. This information can then be recorded in the metadata catalog 320 via the R-Cloud plug-in modules 330.

More particularly, each item in the catalog, be it a set of data objects (such as database) or even a single data object (such as an individual file) has an associated data protection attribute. In some examples, the data protection attribute may be a »canBackup« attribute that indicates whether the object can be independently backed up such as by accessing the APIs of the respective SaaS service 340. The R-Cloud Modules 330 thus access the catalog 320 to determine how to implement data protection for each object.

For example, a data object that can be backed up by the service itself (such as a database in a CloudSQL application) may have its »canBackup« attribute set to True.

In case of a simple SaaS such as Cloud SQL 340-1, each object such as a database may its »canBackup« property set to True. This means that the R-Cloud Platform 310 can invoke the R-Cloud plug-in 330-1 and then know to call concurrently the SaaS specific backup method via the Cloud SQL 340-1 API 335-1. This frees the end user from having to know the backup or other data protection capabilities of each specific SaaS.

However, in the case of a SaaS application that hosts millions of objects (for example Dropbox 340-2, SalesForce 340-3, etc. . . . ), and where per-object granularity is required, the R-Cloud Module may return False for the attribute »canBackup«.

Thus, for a simple SaaS, the metadata catalog may have only a single attribute. However, for a more complex SaaS, the metadata catalog may have many attributes that are exposed via API 360 to the end user/developer 350. For example, the R-Cloud platform 310 may enable end users/developers 350 to browse the catalog 320 via the R-Cloud Modules 320 by invoking a List operation to discover the backupable items. The end user/developer 350 may then further augment the metadata in the catalog 320 with information that describes a backup workflow that is outside the SaaS APIs themselves.

If we refer back to FIG. 2 (Description of Complex Data Organization within a SaaS Service such as DropBox 340-2):

Up to the Project 201 level the user 350 is able to define the backup granularity.

Information (metadata or attributes) about the items/data contained within each Project 201 at the backup time will be stored in the catalog 320 by the R-Cloud Module 330 together with backup data during the backup operation. All of the items below the Project level 201 (such as folders 203 and files 205) have their »canBackup« attribute set to False, meaning that they cannot be separately selected/unselected for backup.

Within the R-Cloud platform's 310 API 360, the user 350 can select a specific project 201 (and its backup version) and invoke a browse option (which operates a list method of the R-Cloud Module 330-2 for the SaaS 340-2). This enables the user to discover which items were also actually backed up when respective Project was backed up by the SaaS.

After browsing and selecting low level items, an available data restore workflow operation (outside of the SaaS 340-2 itself) may individually specified by the user via the API 360 and recorded in the catalog 320. This workflow can then be invoked by the R-Cloud platform 310 via the R-Cloud Plug-in module 330-2 when recovery is requested. Other aspects of recovery, such as data dependencies (recovery order) may also be recorded as metadata in the catalog 320.

It can now be understood that with this approach, the SaaS-specific functions are implemented in the R-Cloud Plug-ins 330, freeing the end user 350 from having to understand the specifics of whether each SaaS 340 implements a data protection schem and to what extent.

The system can now invoke an automatic recovery workflow and be assured that the appropriate method for each SaaS will be invoked, regardless of the structure of data objects. The back up may be entirely done by the respective SaaS (such in the CloudSQL 340-1 example above), or completely managed by the R-Cloud plugin module 330-2 discovering the appropriate methods (such as in the Drop-Box 340-2 example), or some mix of the two. The R-Cloud plug ins 330 use the catalog 320 to understand the specifics of each SaaS service's 340 backup abilities, freeing the end user 350 from having to know these details.

Figure 4:
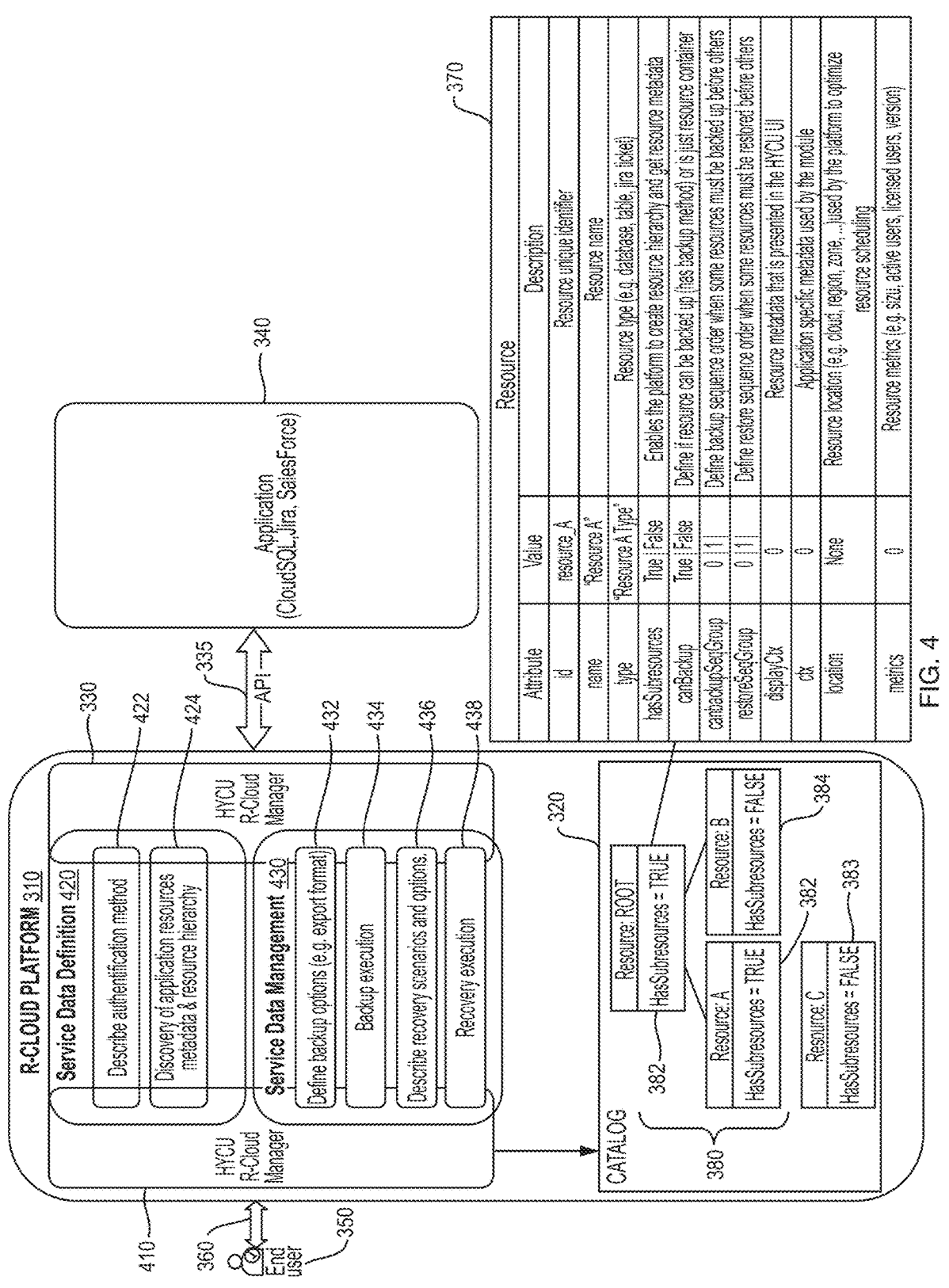
FIG. 4 is an example of how the R-Cloud Platform interacts with a data catalog.

FIG. 4 is a more detailed depiction of the R-Cloud Platform 310 and how the API 360 can be leveraged by the user 350. In general, discovery of each SaaS is performed to determine if it has a corresponding data protection method and its attributes, such as a backup method, restore method, configuration method, or status method. Other information, such as lists of required attributes and optional attributes is also collected. The specifics of each method and list of attributes differs depending on the type of SaaS application 340.

More particularly, the R-Cloud Platform includes an R-Cloud Manager 410 component, a Service Data Definition 420, and Service Data Management 430, and the R-Cloud Modules 330. Each R-Cloud Module 330 is programmed to access its associated SaaS application 340 such as through an Application Programming Interface (API) 335. There is a different API 335 for each SaaS application 340.

The Service Data Definition 420 consists methods that include an authentication method 422 and a discovery method 424. These methods are used to discover attributes of a SaaS 340, resource, such as during a LIST operation. Each such LIST operation may return a list that describes certain aspects of the structure of the SaaS application. The structure may identify a list of required attributes that the R-Cloud platform 310 will then use to drive backup and restore methods, as well as an optional list of other attributes.

Service Data Management 430 may include methods for defining backup options 432, backup execution 434, defining recovery services 436 and recovery execution 438.

As shown in FIG. 4, the attributes 370 discovered for each SaaS may include values for an identifier, name, and SaaS type. Also discovered may be attributes such as whether or not the SaaS has other related dependent or subservient data objects, provides its own backup method, defines a backup sequence, or defines a restore sequence. Still other attributes may include whether the SaaS can display metadata, its location, and other metrics.

An example of a discovered attribute for a SaaS is its »canBackup« attribute. This indicates to the R-Cloud platform 210 that the SaaS implements a native backup method.

Example optional attributes may further define the »can-Backup« attribute to specify, at one or more levels of a data hierarchicy, whether backup protection is available. For an example CloudSQL SaaS, the »hasSubResources« can be set to True. The child resources may be further defined as optional attributes, such as a list of cloud SQL servers, a list of of SQL instances are running on each server, a list of databases running on each SQL instance, and a list of tables in each database. The optional attributes may further specify a »canBackup« attribute for each object in the list, such that it can be determined whether each server, instance, database, and table can or cannot be backed up at its corresponding level.

In the illustrated example of a DropBox SaaS, the catalog indicates that the data objects 380 include aafile structure that has a root (top level) folder 382 that hasSubResources. A resource A 382 itself is a folder that hasSubResource C 383. Resource C 383 does not have any child resource. The hasSubResource for object B 384 also indicates that it does not have any child resources.

Example for Cloud SQL

7

8

In case of a SaaS resource such as Cloud SQL, the catalog entries for a particular server may have a »canBackup« property set to True and other child properties (such as for a tables level) set to False. This means that at backup time the R-Cloud platform will know to call concurrently the r-cloud module for each backup-enabled resource as:

```
backup(instance, options) backup(database-1, options)
...
backup(database-n, options)
```

In a case where certain operations need to occur in a certain order a developer can use other attributes, such as a backupSeqGroup and/or restoreSeqGroup attributes to control the order of operations. In case of Cloud SQL, the instance resource type may have restoreSeqGroup set to 1 and all database resources will have restoreSeqGroup set to 2. This means that the R-Cloud platform will execute:

restore(instance, options)

and wait for this instance of the restore operation to finish before then concurrently executing the database restore operations:

```
restore(database-1, options)
...
restore(database-n, options)
```

Figure 5:
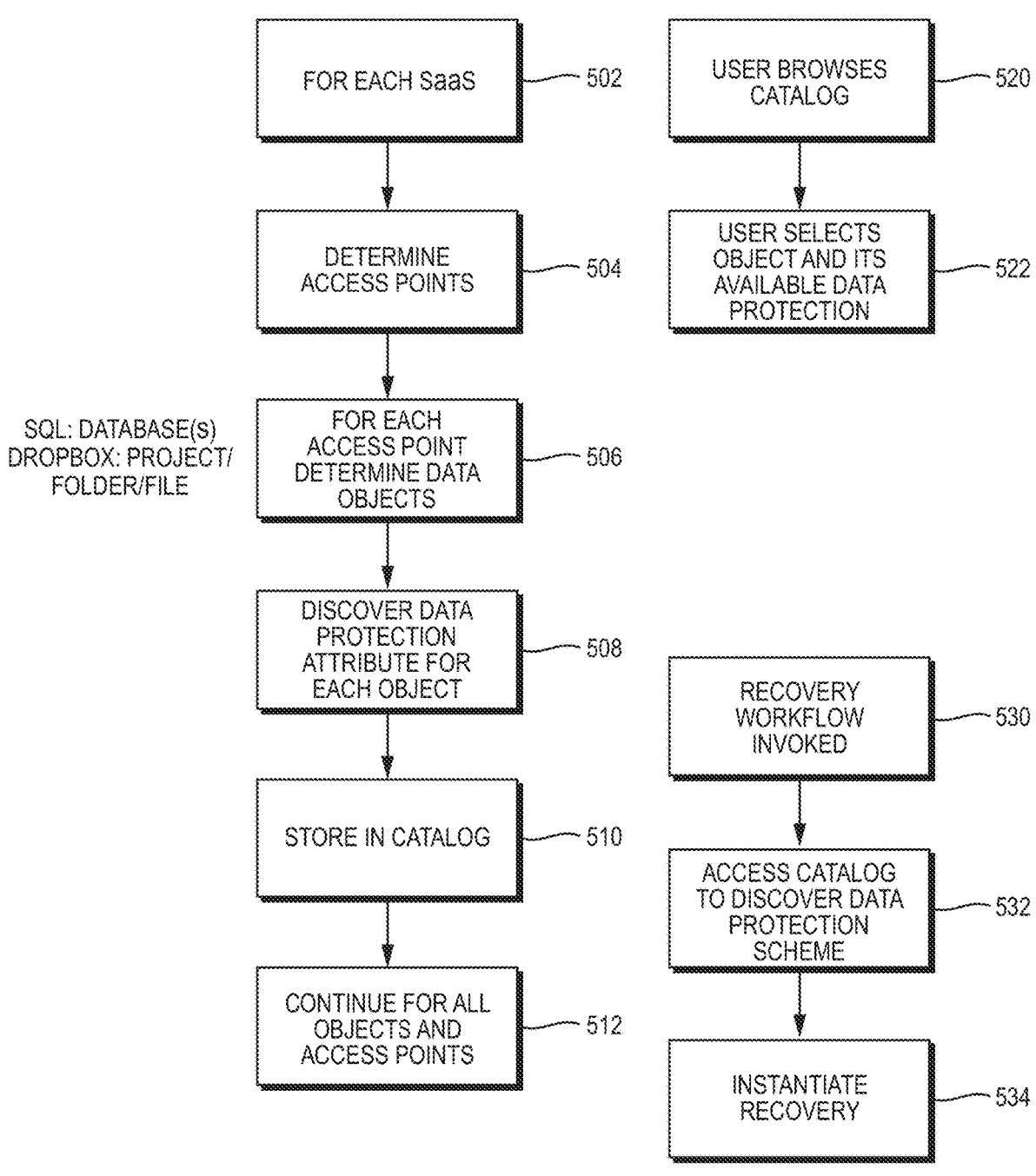
FIG. 5 is a flow diagram of a method that may be used to implement data protection as described herein.

FIG. 5 is a high level flow diagram of a method that may be used to implement aspects of this data protection scheme using the system and features as described above.

In a first step 502, a set of services are identified.

Next in step 504, access points for each given service are determined.

In step 506, for each access point, data objects are determined. For example, the data objects in the case of a SQL service may include one or more databases. However, for a Dropbox service, the granularity of the data objects may be projects, folders and files. Other services may have other types of data objects.

Next, in step 508, a data protection attribute for each data object is determined. As explained above, this may include a >>can_Backup<<attribute for that data object.

This information is then stored in a catalog in the next step 510.

At 512, this process flow continues for all objects and access points in all services.

Step 520 represents some later time at which a user may browse the catalog and in step 522 select an access point or an object and review or change its available data protection status.

At step 530, which is some later time still, a recovery workflow is invoked. The catalog may thus be accessed at step 532 to discover data protection schemes in use and then instantiated at step 534. Note that this catalog is configured and maintained outside of SaaS itself, even if a given service itself provides protection.

Further Implementation Options

It should be understood that the workflow of the example embodiments described above may be implemented in many different ways. In some instances, the various "data processors" may each be implemented by a physical or virtual or cloud-based general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable tangible medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic or electronic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Embodiments may also leverage cloud or other remote data processing services such as Amazon Web Services, Google Cloud Platform, and similar tools. However the services may also be locally hosted.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. A method for automatic data protection for one or more resources provided by a service, wherein the service operates in a computing environment that deploys one or more access points to which Application Programming Interface (API)-based requests are directed, and wherein the service resources relate to data objects arranged at one or more levels of a hierarchy, the method comprising:

responsive to receipt of an API request for data protection,
discovering data objects accessed by the service resource,
  by operating a selected one of plurality of modules,
  each module corresponding to one of a plurality of
  different services, and each module executing at least
  some requests that are specific to the service resource,
discovering attributes specific to the data objects, including a data protection attribute that indicates whether a
  data protection method is accessible to protect the data
  objects via the service resource at one or more levels of
  a hierarchy;
obtaining information for use with another data protection
  method that is other than via the service resource;
storing, in a centralized catalog, information that
  describes a data protection workflow for the service,
  including whether the data protection method is provided by the service or whether it is an other data
  protection method external to the service;
and executing a granular data protection process, by
  accessing the centralized catalog to determine data
  protection attribute information for each data object,
  and
when the data protection attribute is true,
invoking the data protection method accessible via the
  service resource;
else when the data protection attribute is false,
invoking the other data protection method.

2. The method of claim 1 wherein discovering attributes further comprises determining a workflow for invoking a data protection method that is other than via the service resource.

3. The method of claim 1 wherein the step of discovering attributes is implemented in a plug-in operating within the service.

4. The method of claim 1 wherein the step of executing the granular data protection process is implemented on a data processing platform outside of the service resource.

5. The method of claim 1 wherein the service is a SaaS, PaaS, DBaaS, or IaaS.

6. The method of claim 1 wherein the data protection attribute indicates whether the service provides backup for the data object.

7. The method of claim 1 wherein the data protection attribute indicates whether the service provides recovery of the data object.

8. An apparatus comprising:
a hardware processor; and
computer memory holding computer program instructions
  executed by the hardware processor for access control
  in a computing environment in which clients interact
  with an application deploying one or more access
  points to which application programming interface
  (API)-based requests are directed, the computer program instructions configured for:
responsive to receipt of an API request for data protection,
discovering data objects accessed by the service resource,
  by operating a selected one of plurality of modules,
  each module corresponding to one of a plurality of
  different services, and each module executing at least
  some requests that are specific to the service resource;
discovering attributes specific to the data objects, including a data protection attribute that indicates whether a
  data protection method is accessible to protect the data
  objects via the service resource at one or more levels of
  a hierarchy;
obtaining information for use with another data protection
  method that is other than via the service resource;
storing, in a centralized catalog, information that
  describes a data protection workflow for the service,
  including whether the data protection method is provided by the service or whether it is an other data
  protection method external to the service;
and executing a granular data protection process, by
  accessing the centralized catalog to determine data
  protection attribute information for each data object,
  and
when the data protection attribute is true,
invoking the data protection method accessible via the
  service resource;
else when the data protection attribute is false,
invoking the other data protection method.

9. The apparatus of claim 8 wherein discovering attributes further comprises determining a workflow for invoking a data protection method that is other than via the service resource.

10. The apparatus of claim 8 wherein the step of discovering attributes is implemented in a plug-in operating within the service.

11. The apparatus of claim 8 wherein the step of executing the granular data protection process is implemented on a data processing platform outside of the service resource.

12. The apparatus of claim 8 wherein the service is a SaaS, PaaS, DBaaS, or IaaS.

13. The apparatus of claim 8 wherein the data protection attribute indicates whether the service provides backup for the data object.

14. The apparatus of claim 8 wherein the data protection attribute indicates whether the service provides recovery of the data object.

15. A computer program product in a non-transitory computer readable medium for access control in a computing environment in which clients interact with an application deploying one or more access points to which application programming interface (API)-based requests are directed, the computer program product holding computer program instructions that, when executed by a data processing system, is configured to:

responsive to receipt of an API request for data protection,
discovering data objects accessed by the service resource,
  by operating a selected one of plurality of modules,
  each module corresponding to one of a plurality of different services, and each module executing at least some requests that are specific to the service resource;

discovering attributes specific to the data objects, including a data protection attribute that indicates whether a data protection method is accessible to protect the data objects via the service resource at one or more levels of a hierarchy;

obtaining information for use with another data protection method that is other than via the service resource;

storing, in a centralized catalog, information that describes a data protection workflow for the service, including whether the data protection method is provided by the service or whether it is an other data protection method external to the service;

and executing a granular data protection process, by accessing the centralized catalog to determine data protection attribute information for each data object, and when the data protection attribute is true, invoking the data protection method accessible via the service resource;

else when the data protection attribute is false, invoking the other data protection method.

* * * * *